Patented Aug. 17, 1926.

1,596,413

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PAINT AND VARNISH REMOVER CONTAINING FURFURAL.

No Drawing. Application filed March 2, 1923. Serial No. 622,451.

This invention relates to paint and varnish removers containing furfural and especially to this solvent incorporated with other solvents with or without appropriate thickening material and further relates to compositions containing chlorinated solvents.

When applied by itself furfural drains off of vertical surfaces and this action is aggravated by the fact that furfural does not wet the surface readily but tends to gather in drops. The addition of an auxiliary or co-operative solvent such as alcohol, acetone, benzol, toluol, xylol, solvent naphtha and various chlorinated solvents such as carbon tetrachloride, acetylene tetrachloride, trichlorethylene and particularly monochlorbenzol or monochlortoluol may be utilized to overcome the difficulty of lack of surface wetting.

To give body or consistency to the composition a thickener may be applied including wax, soap and various other thickeners such as the esters of cellulose in some cases. Wax is especially serviceable to retard the evaporation of volatile solvents and for this purpose paraffin or ceresin wax is best. Furfural is slow to evaporate but may be incorporated with more volatile solvents hence may act to retard evaporation of the latter, is used. A small amount of wax, say from two to five per cent is usually sufficient, but larger amounts may be employed in some cases. The proportion in fact depends on the nature of the other solvents. If these are solvents for wax a larger proportion of the latter should be used when the auxiliary solvent is a precipitant for wax.

Furfural possesses a low degree of inflammability in comparison with many other solvents and in the present invention in the preferred form is preferably incorporated with other solvents having a low degree of inflammability. Benzol, acetone and similar solvents commonly used in volatile solvent removers flash at comparatively low temperatures. Solvent naphtha and xylol have a considerably higher flashing point but do not possess pronounced cutting properties, that is do not have a marked solvent action on coats of paint or varnish and when added in substantial quantity to removing compositions of an active character tend to retard the solvent action of the composition. Monochlorbenzol has however proved effective as a solvent and may be incorporated with furfural in any proportion. For example equal parts by volume or weight of furfural and monochlorbenzol may be mixed and the composition used as a remover. Better results are obtained by the addition of three per cent of paraffin wax. This may be incorporated in any suitable manner as by melting the wax, dissolving it in chlorbenzol and adding furfural.

Seven parts by volume of chlorbenzol to three parts of furfural containing five per cent of wax also may be employed. The proportions of chlorbenzol may be varied to give a major proportion of the latter if desired.

Compositions containing furfural with chlorbenzol or chlortoluol do not burn readily or flash as easily as more volatile solvent removers and in order to cause ignition of the finish removing composition containing furfural when spread on a flat surface, it is usually necessary to hold a burning match close to the surface for a sufficient time to cause volatilization and production of vapors in considerable quantity in order to produce inflammation.

Not all volatile solvents are adapted to be used with furfural, gasoline and petroleum naphtha not being miscible and furthermore not possessing any satisfactory paint and varnish removing qualities. To secure good results solvents which are miscible should be chosen or if an immiscible solvent is to be included the addition of blending solvents sometimes will bring about miscibility. In general the requirements of a paint and varnish remover of a commercial character necessitate the employment of solvents only of strong cutting qualities and the addition of indifferent solvents tends to produce a low grade remover of unsatisfactory qualities.

What I claim is:—

1. A paint and varnish remover containing furfural, another solvent of low inflammability readily miscible therewith, and a wax, such composition having the property of promptly and uniformly wetting vertical surfaces without segregating into droplets.

2. A paint and varnish remover comprising furfural, monochlorbenzol and a wax.

3. A paint and varnish remover comprising furfural and chlorbenzol.

4. A paint and varnish remover containing furfural, chlorbenzol and a thickening agent.

5. A paint and varnish remover containing furfural, another solvent of low inflammability readily miscible therewith, and a thickening agent, such composition having the property of promptly and uniformly wetting vertical surfaces without segregating into droplets.

CARLETON ELLIS.